Dec. 23, 1924.
O. BÜCHNER
1,520,559
LENS AND THE ARRANGEMENT OF LENSES
Filed March 30, 1921
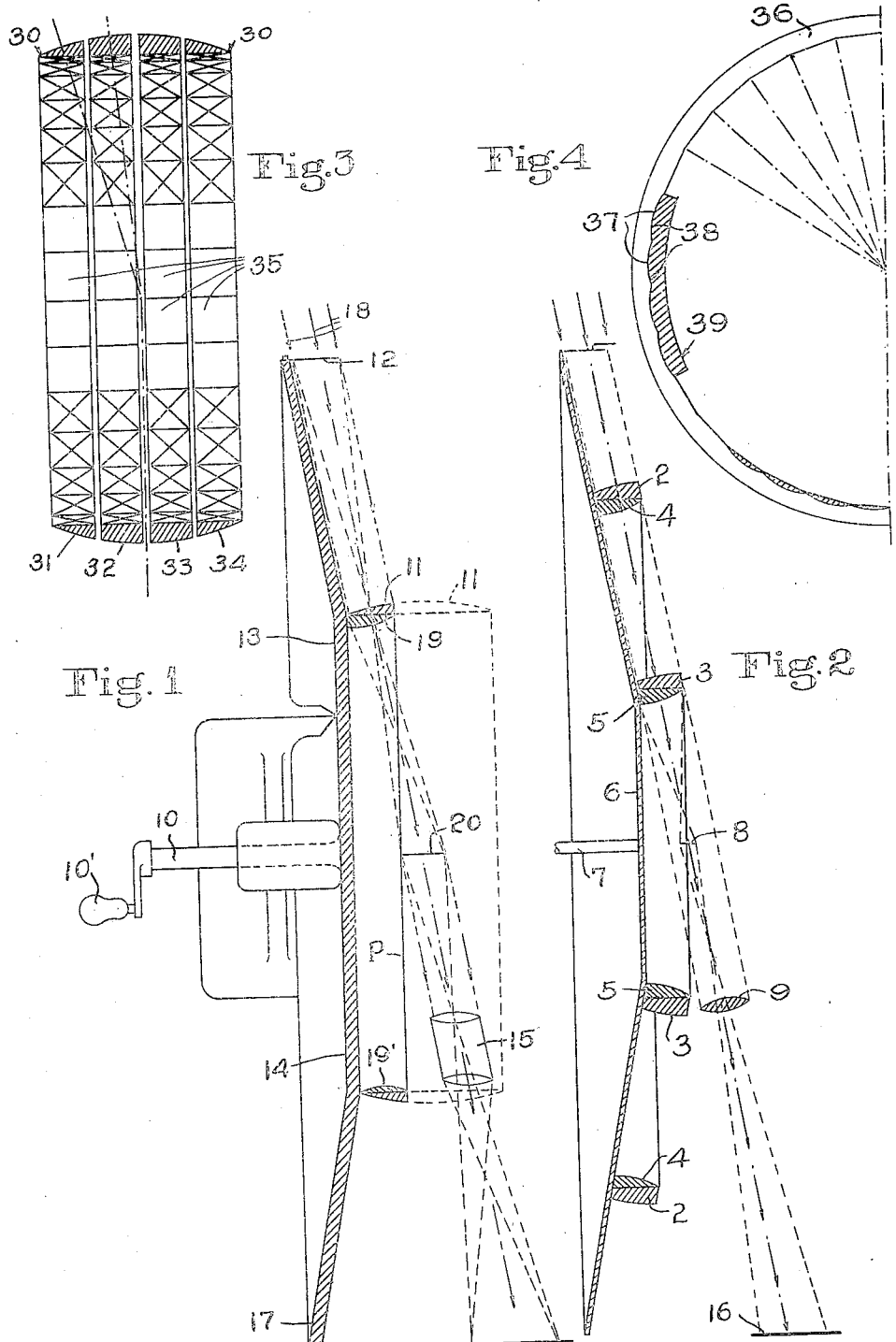
Inventor:
Oswald Büchner
By- B. Singer, Atty.

Patented Dec. 23, 1924.

1,520,559

UNITED STATES PATENT OFFICE.

OSWALD BÜCHNER, OF HONGG, NEAR ZURICH, SWITZERLAND.

LENS AND THE ARRANGEMENT OF LENSES.

Application filed March 30, 1921. Serial No. 456,867.

(GRANTED UNDER THE PROVISIONS OF THE ACT OF MARCH 3, 1921, 41 STAT. L., 1313.)

*To all whom it may concern:*

Be it known that I, OSWALD BÜCHNER, a citizen of the German Republic, residing at Villa Schwertgutli, Hongg, near Zurich, Canton Zurich, Switzerland, have invented new and useful Improvements in Lenses and the Arrangement of Lenses (for which I have filed application for patent in Germany February 10, 1919), of which the following is a description.

This invention relates to improvements in the lens system for projecting apparatus, and particularly for motion picture apparatus.

It is an object of the invention to avoid the flicker which is inevitable in all of those motion picture apparatus in which a relative movement of the picture carrier occurs with respect to the projecting lens.

Motion picture apparatus have been designed in which, in order to decrease the occurrence of flicker, a movement was imparted to the projecting lens, accompanying the picture carrier or film (so to speak) during the period of projection, and returning each time to the initial position in the period intervening between two projection periods. In these known apparatus, therefore, the objective was moved back and forth while the picture carrier traveled in uniform direction intermittently. A movement of the carrier relative to the objective, therefore, occurred in these apparatus at intervals even in a direction opposite to the direction of film movement, and owing to the inertia of the masses and to the necessary complications of mechanisms, these apparatus did not find a ready market.

The present invention is based on the principle that the film being given a unidirectional movement, the projector shown as a combination of lenses also is moved in uniform direction. The film may travel on a part of its path in an arc of the circle, and hence the combination of projecting lenses also is moved in a circular path, retaining thereby permanently the same relative position with respect to that portion of the picture carrier which is to be projected therethrough.

The invention also has the object of producing through the combined movement of picture carrier and objective a picture in a plane which is fixed with respect to the path of movement.

It also has the object of superimposing successively projections, and of simultaneously with this superimposition of subsequent projections withdrawing precedent projections from the fixed plane.

It also has the object of utilizing the real pictures produced in this way in a fixed picture plane with respect to the orbit of picture carrier and lens, for the purpose of projecting these real pictures from the fixed plane on a fixed screen.

It may therefore also be said that the invention has the object of producing a secondary nontraveling picture from a primary traveling picture through projection, and of projecting the secondary non-traveling picture on a stationary screen.

The invention also has the object of utilizing an annular lens or series of lenses to which unidirectional movement is imparted in a path concentric with the axis of this annular objective simultaneously with the movement of the picture carrier, the primary projection taking place through that portion of the carrier which at the time of this projection also is disposed concentrically to the axis of the annular objective.

In this way the relation of the movable objective to the movable carrier is maintained at all times of the primary projection, avoiding thereby the flicker and imparting to the projected motion picture an absolutely stationary uniformly life-like appearance, without any intermittent or recurring eclipses.

With these and other objects in view, the invention is fully described in the following specification and the novel advantages are pointed out in the appended claims. In the specification reference is made to the accompanying drawings, wherein:

Fig. 1 shows diagrammatically a projecting apparatus of this kind, in section.

Fig. 2 is a diagrammatical representation of a slightly modified device, serving the same purpose.

Fig. 3 illustrates diagrammatically in section a plurality of annular lenses.

Fig. 4 is an edge view and partly section of a similar lens in combination with a second annular correcting lens.

Fig. 1 shows a circular disc support 13 having an approximately flat central portion 14 and a relatively broad marginal portion 17 which is inclined or flaring with respect to the central portion 13. This disc supports at the edge of the central flat portion 13 an annular lens 11. The support may be rotated by means of a central shaft 10, which may be driven in some suitable way, as for instance by the crank 10'. This annular lens 11 may be a zone portion of a complete annular lens 11' (indicated in dotted lines) which, however, is not used to the full extent, a marginal zone only of the lens 11' being used for the purpose of projection. A second lens is associated with the lens portion 11 also of annular shape, and having one face in engagement with the lens 11, being preferably secured thereto in some approved way. The lens 11', of which the portion 11 only is used, forms a part of a sphere preferably an equatorial or meridial zone portion thereof. The second lens system or lens is ground to such configuration that by the compound action the two lenses produce a real picture in a plane which contains the axis of rotation, if the object is located at the margin of the support 13. If, therefore, an object, as for instance a portion of a picture carrier 12 is illumined through a suitable source of light, of which only a few rays are indicated at 18, and is located at the edge of the support, those lens portions which are in opposition to the source of light and to the film portion 12 to be projected, will produce a real picture of said film portion at 20.

The additional annular lens may for instance have a cross-section similar to that of the lens 11, as indicated at 19, and inversely placed with respect to the lens 11, or it may have another suitable cross-section, as for instance indicated at 19', where it is shown to have the section of a plane convex lens.

The picture 20 is, as stated, in a plane containing the axis of rotation and at approximately right angle to the axis of the light pencil. That edge of the picture 20 which is closest to the support 13, however, is located in a plane perpendicular to the axis of rotation and containing the outer edge of the annular lens arrangement 11, 19, as indicated at P. The plane of the picture 20 will be stationary or fixed in space, although the picture carrier or object and the objective are movable. This stationary picture may now be projected through an arrangement of projecting lenses 15 onto a suitable screen diagrammatically shown at 16.

From this it will be seen that an absolutely stationary and projectable picture is produced from an object moving in a predetermined circular path, and that this primary projection, absolutely stationary in space, serves as object for a second projection which, of course, also is fixed in space.

As long as the real object 12 and the primary projector travel in a circular path, and the projector is selected to produce a picture in the axis of rotation, this picture will be stationary no matter from which point of the circular path the projection takes place. In practice, however, only a relatively small arc of the path,—in direct opposition to the light 18 will be utilized for projecting purposes. Successive objects, i. e., film pictures are therefore projected at 20 without the slightest flicker. They are so to speak superimposed at 20, and whenever an object 12 leaves the point opposite the light 20, to give way to the next object, i. e., film picture in the film series, the picture 20 derived from the leaving object will be replaced by a picture 20 of the oncoming object, all without any eclipse or other visual disturbance.

In the modification illustrated in Fig. 2 the circular support 6 of the system is mounted on a central shaft 7 to which a movement may be imparted by hand, or by a motor not shown. In this modification the support 6 serves for carrying two annular lens systems, the inner lens system being composed of the annular lenses 3 and 5 which are constructed and arranged similar to the annular lenses 11, 19, of the first described modification, while additional circular lenses 2 and 4 in a similar arrangement are concentrically disposed with respect to the lens system 3, 5, and serve for directing the rays of light 18 through the lens system 3 and 5. Here, also therefore, a real picture of the object 1 is produced at 8 in a plane containing the axis of rotation of the entire system, and this picture 8 may be projected through the lens system 9 to a suitable screen 16.

It will be seen from Fig. 2 also that the object 1, while moving in a circular short arc, will produce a projection 8 fixed in space, and that here also a second fixed projection at 16 is produced from the first projection 8.

The additional lenses 4 and 5 serve the purpose of the lenses 19 or 19', illustrated in Fig. 1, and are utilized for correcting those aberrations which are difficult to avoid in optical projection.

Fig. 3 illustrates annular lenses which may be used in connection with a device of this kind. While ordinary or ideal lenses usually have a spherical outer surface and are therefore constructed as calottes, in the present system the lenses may be constructed as portions or meridial zones of a sphere, i. e., zones extending from a meridian of a sphere equal distance in opposite directions. These zones may then be subdivided as shown in Fig. 3 so as to provide for the utilization of portions only of these zones. So, for instance, in Fig. 3 the meridial zone lens 30 is subdivided into four zones, 31, 32, 33 and 34, the optical properties of the zones 31 and 34 being alike to each other, although the zones are reversed relatively to each other, and this also applies to the portions 32, 33. The subdivision of the zone lens 30 is effected on planes perpendicular to that diameter which is the axis of the meridial zone lens. The inner object zones 32 and 33 have prismatic cross-section or approximately prismatic cross-section of opposite angular inclination, similar to the lens used in stereoscopic apparatus, a feature which is also common to the outer zone lenses 31, 34. These zone lenses may therefore also be used in place of stereoscopic lenses upon proper association.

Instead of making the inner face of these annular lenses 31 to 34 absolutely cylindrical, these lenses may be ground on their inner faces to provide a number of equal planes 35 corresponding to the number of pictures on the picture carrier which are to be projected at one rotation of the lens. These flat faces 35 may also serve as seats for corrective lenses, as for instance indicated at 19, 19', in Fig. 1, or at 4 and 5 in Fig. 2.

Fig. 4 illustrates a slight modification of one of these zone lenses, seen from the top or edge. While according to Fig. 3 the inner surface of the zone lenses is ground to present a number of uniform plane surfaces 35, the inner surface of the annular lens 36, Fig. 4, is ground to present a number of concave seat portions 37 adapted to receive convex portions 38 of a corrective annular lens 39.

While the device has been described with reference to its use in motion picture projection, it is obvious that it may also be used for still projection or for other purposes.

I claim:

1. In a device of the character described, the combination of a picture carrier, a source of light, a lens disposed in the path of light passing through the pictures and adapted to project the pictures, and means for rotating said lens and carrier with equal angular speed about a common axis, the lens being adapted to project the picture of the carrier into a plane containing the axis of rotation.

2. In a device of the character described, the combination of a circular film feeding disc, means for rotating the disk and an annular lens fixedly associated with said disc and adapted to project pictures from the film into a plane containing the axis of rotation.

3. In a device of the character described, the combination of a film feeding disc, means for rotating the disc, an annular lens concentric to said disc, and adapted to project pictures from the film into a plane containing the axis of the disc, and means for re-projecting said pictures onto a screen.

4. In a device of the character described, the combination of a circular film feeding disc, an annular lens system secured thereto concentric with the disc, means for rotating said disc and annular lens system, the system comprising two annular lenses in compound arrangement, a second lens combined with the first named lens, the compound lens being adapted to project successively pictures of the film during the feeding movement into an imaginary plane containing the axis of rotation, and means for re-projecting said pictures produced by the compound lens.

5. In a device of the character described, the combination of a circular film feeding disc, a compound lens secured thereto adapted to project a picture of the film into a plane containing the axis of the disc regardless of the position of the lens on said disc, and means for re-projecting the picture produced by said lens onto a screen.

6. In a device of the character described, the combination of a circular film feeding support, an annular lens secured to said support and concentric thereto, another lens placed into engagement with said first named lens to produce the compound lens, the compound lens being adapted to project a picture of the film on said support into a plane containing the axis of the support, and means for re-projecting the picture produced by said annular compound lens.

7. In a device of the character described, the combination of a circular film support, an annular lens carried thereby concentric with said support, means for rotating said support and lens, the lens being provided with a flat surface directed towards the axis of the support, another lens seated on said flat surface to produce a compound lens adapted to project a picture from the film into a plane containing the axis of the support, and means for re-projecting the picture produced by the compound lens onto a screen.

In witness whereof I affix my signature.

OSWALD BÜCHNER.